Figure 1:
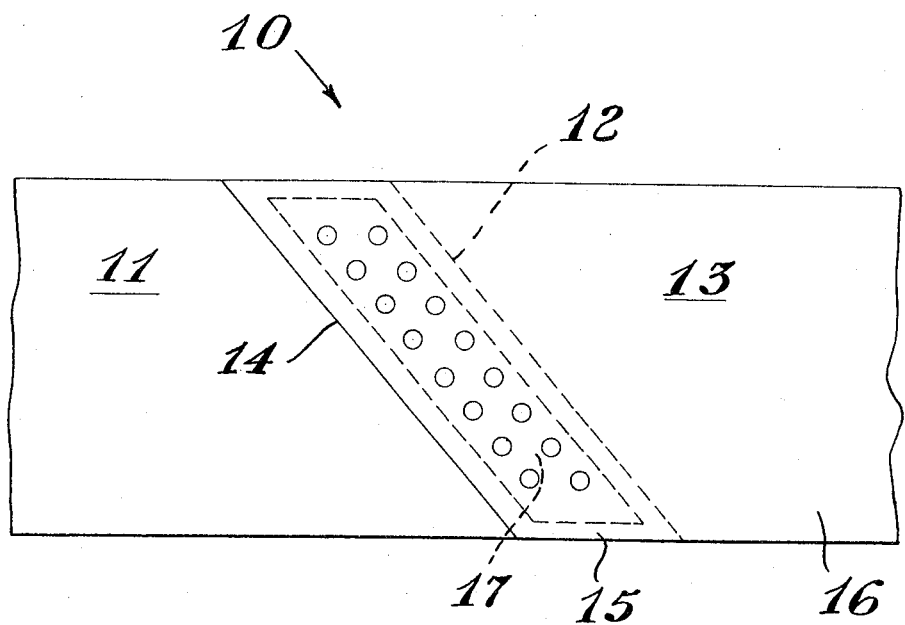

United States Patent [19]
Swearingen et al.

[11] 3,762,028
[45] Oct. 2, 1973

[54] JOINING OF PLASTIC/METAL FOIL LAMINATES

[75] Inventors: Charles C. Swearingen, Bay Village; Nicholas Sheptak, Rocky River, both of Ohio

[73] Assignee: The Dow Chemical Company, Midland, Mich.

[22] Filed: Feb. 25, 1972

[21] Appl. No.: 229,325

[52] U.S. Cl............ 29/470.1, 29/471.1, 29/471.9, 29/482, 156/153, 156/306
[51] Int. Cl............................................ B23k 21/00
[58] Field of Search................. 29/475, 482, 470.1, 29/624, 628, 471.1, 471.9; 156/153, 306

[56] References Cited
UNITED STATES PATENTS

| | | | |
|---|---|---|---|
| 2,450,655 | 10/1948 | Goldsworthy | 29/482 |
| 2,466,890 | 4/1949 | Gilbertson | 29/482 X |
| 2,768,105 | 10/1956 | Dittmore et al. | 29/628 X |
| 2,977,672 | 4/1961 | Telfer | 29/682 X |
| 3,156,514 | 11/1964 | Wing et al. | 29/628 X |
| 3,252,203 | 5/1966 | Alberts et al. | 29/628 X |
| 3,470,607 | 10/1961 | Rader et al. | 29/470.1 |

*Primary Examiner*—Richard B. Lazarus
*Attorney*—William M. Yates et al.

[57] ABSTRACT

Plastic/metal foil laminates are joined by removing a portion of the plastic of the laminate by means of a wire brush applied within a critical range of surface speeds to remove a window of the plastic surface and two adjacent metal surfaces are joined together by conventional welding means.

5 Claims, 2 Drawing Figures

PATENTED OCT 2 1973　　　　　　　　　　　　　　3,762,028

JOINING OF PLASTIC/METAL FOIL LAMINATES

For many applications it has been desirable to employ a laminate which comprises a metal layer having disposed on at least one surface thereof a layer of a thermoplastic material. One particularly useful combination of such a laminate is an aluminum foil and an ethylene/acrylic acid copolymer such as an ethylene/acrylic acid copolymer containing from about 5 to 20 weight percent acrylic acid. Such laminates which may have the plastic coating on one or both surfaces are employed with great benefit in electrical cables as shielding and moisture barrier. The ethylene/acrylic acid polymers provide a high degree of adhesion to the metal as well as to themselves, thus permitting a foil to be disposed about one or more conductors and rapidly heat sealed to provide an electrically conductive tube or shield which is resistant to water permeation and corrosion. However, such laminates generally contain aluminum foil layers in thicknesses ranging from 3 to 15 mils and occasionally from about 1 mil up to 30 mils with one or two surface layers of a plastic. Oftentimes the aforementioned ethylene/acrylic acid copolymer ranges in thickness from one to 10 mils, and beneficially from about 3 to 6 mils, depending upon the particular cable and the characteristics desired therefrom. Although such plastic-surfaced plastic/metal laminates may be cold welded together without removal of the plastic material described in U.S. Pat. No. 3,557,983 (the teachings of which are herewith incorporated by reference), oftentimes it is desirable to remove the plastic from the surface of the laminate prior to joining by a method such as cold welding in order to achieve decreased electrical resistance of the weld. On heavier plastic/metal laminates removal of the plastic material preparatory to welding is readily accomplished in a variety of manners. One technique is to employ a router which is adjusted to cut through the depth of the plastic and the plastic and a small amount of the metal are removed. Such an operation is quickly and easily accomplished employing a router guide. However, in the processing of laminates having a relatively thin metal layer, such as aluminum, copper or the like where the thickness is small; for example, 3 to 15 mils, and normal manufacturing variations in the plastic layer occur, the use of a router can be impractical. For example, if a 3 mil thick aluminum layer is in the laminate and a plastic layer is employed which may have a thickness variation of 1 mil, a substantial portion of the metal layer will be removed using a fixed depth cutter. An alternate approach to removing the plastic layer is to ignite the plastic and employ an impact and shearing means such as a wire brush to remove the remaining char. Solvents for the plastic material are an alternate approach, as is the method of attempting to strip or peel the plastic layer from the metal layer. Often such techniques do not appear to remove all of the plastic material from the surface or they do this only with great difficulty and frequently with substantial damage, and indeed, cutting entirely through the metal substrate, particularly when the metal is aluminum. In the event that the removal technique leaves a layer or portions of a layer of plastic, oftentimes an entirely satisfactory weld is not obtained; that is, a weld of maximum strength and maximum electrical conductivity. If the foils are joined by such techniques as tungsten-inert-gas welding or electron beam or laser beam welding, thermal decomposition of plastic material often results in joints of less than the mechanical and electrical characteristics.

It would be desirable if there were available an improved method for joining of plastic/metal laminates.

It would also be desirable if there were available an improved method for the joining of plastic/metal laminates wherein the plastic laminate is readily and cleanly removed in a desired location.

It would further be desirable if there were available such a method which could be readily utilized employing minimal equipment and operational skill.

These benefits and other advantages in accordance with the method of the present invention are achieved in a method for the removal of a plastic layer from a plastic/metal laminate, the steps of the method comprising contacting the surface of the plastic layer with a rapidly rotating impact and shearing means for a time sufficient to remove the plastic material and cause the surface of the metal to achieve a grainy appearance, the shearing and impact means having a plurality of impacting bristles generally radially disposed about a rotating shaft and having an unsupported length to diameter ratio of at least about 20:1, the terminal portion of the bristles remote from the rotating shaft having a surface speed of at least 3,000 feet per minute and beneficially at least about 5000 feet. Advantageous joints are obtained by contacting two such surfaces cleaned as hereinbefore described and joining said surfaces with a metallic bond.

A wide variety of laminates are joined in accordance with the present invention. Such laminates include those with metals such as aluminum, copper, zinc, mild steel, stainless steel and the like having laminated thereto one or more layers of a polymer desirably having adhesive properties. An adhesive polymer which is used with benefit in the practice of the invention is a normally solid thermoplastic polymer of ethylene modified by monomers having reactive carboxyl groups, particularly a copolymer of a major proportion of ethylene and a minor proportion, typically from about 1 to about 30, and preferably from about 2 to about 20, percent by weight, of an ethylenically unsaturated carboxylic acid. Specific examples of such suitable ethylenically unsaturated carboxylic acids (which term includes mono- and polybasic acids, acid anhydrides, and partial esters of polybasic acids) are acrylic acid, methacrylic acid, crotonic acid, fumaric acid, maleic acid, itaconic acid, maleic anhydride, monomethyl maleate, monoethyl maleate, monomethyl fumarate, monoethyl fumarate, tripropylene glycol monomethyl ether acid maleate, ethylene glycol monophenyl ether acid maleate, etc. The carboxylic acid monomer is preferably selected from $\alpha,\beta$-ethylenically unsaturated mono- and polycarboxylic acids and acid anhydrides having from 3 to 8 carbon atoms per molecule and partial esters of such polycarboxylic acids wherein the acid moiety has at least one carboxylic acid group and the alcohol moiety has from 1 to 20 carbon atoms. The copolymer may consist essentially of ethylene and one or more of such ethylenically unsaturated acid copolymers, or can also contain small amounts of other monomers copolymerizable with ethylene. The comonomers can be combined in the copolymer in any way; e.g., as random copolymrs, as block or sequential copolymers, or as graft copolymers. Materials of these kinds are already known to the art. Thus, copolymers of ethylene and the specified ethylenically unsaturated acids are made by subjecting a mixture of the starting monomers to elevated temperatures, usually from about 90°C. to about 300°C., preferably from about 120°C. to about 280°C., and at higher pressure, usually above 1000 atmospheres, preferably between 1000 and 3000 atmospheres, preferably in the presence of a free radical initiator such as oxygen, a peroxygen compound or an azo compound. The invention is readily practiced with other plastic (synthetic resinous) layers on a metal substrate. Such plastic/metal laminates are well known and shown in U.S. Pat. Nos. 3,309,455; 3,325,589 and 3,590,141, the teachings of which are herewith incorporated by reference.

Suitable impact shearing devices beneficially include brushes such as wire brushes and glass fiber brushes of the rotary variety. Beneficially such brushes should have an unsupported bristle length to diameter ratio of at least about 20:1 and beneficially about 30:1 to 1000:1. Beneficially such brushes will employ bristles having a diameter of from about 1 to 10 mils. However, the dimension of the bristles is dependent upon the thickness of the metal layer in the laminate to be cleaned. Advantageously, the bristle diameter is from about 0.1 to about 0.85 the thickness of the work piece, and beneficially from about 0.2 to about 0.5 the thickness of the work piece. For laminates one to 10 mils in thickness it is critical that a surface speed of at least 3000 feet per minute be employed, and preferably a surface speed in excess of 5000 feet per minute be utilized. Usually it is desirable to employ as high a speed as possible without destroying the brush; 11,000 feet per minute is very satisfactory for cleaning, but many available wire brushes are severely stressed by the centrifugal force. The tendency of thermoplastic polymers to smear on metal surfaces is very great at low surface speeds, whereas at higher surface speeds, the polymer is readily removed as fine particles. Obvious in the work area is a fine dust and a relatively polymer-free surface is obtained if brushing is continued until the metallic surface takes on a slightly grainy appearance. This grainy appearance is well known on metallic surfaces which are exposed to extensive treatment with a wire brush. Such a grainy appearance has also been referred to as "orange peel" as it has an appearance somewhat similar to the outer surface of an orange with the exception that the irregularities are on a much smaller scale but are readily visible to the eye.

In cleaning laminates containing thin metal foils it is desirable that the bristle or imact shearing member be free to flex, thus, a short, rigid-bristled brush has a marked tendency to cut through the foil as well as through the plastic material. An adequate amount of brushing for a given region generally can be readily detected if a power unit is employed to drive the brush whose speed varies with the load. A hand air grinder or an electrically driven grinder having a universal motor are eminently satisfactory, as when the plastic layer has been removed, the load presented to the motor by the rotating brush increases. When the plastic material has been removed from the surface any workman with minimal skill can readily determine by the sound of the motor when adequate brushing has been obtained in any given location. The brushes employed most beneficially are steel, stainless steel, brass and the like. Usually for maximum service it is desirable to select a metallic bristled brush which is harder and tougher than the metallic substrate being cleaned. Eminently satisfactory are stainless steel brushes having bristles of from about 2 to 5 mils in diameter.

Figure 2:
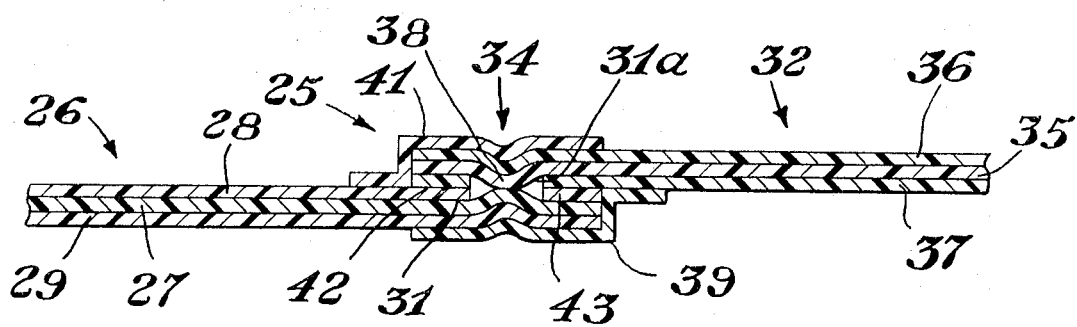

Products prepared in accordance with the practice of the present invention are schematically depicted in FIGS. 1 and 2.

FIG. 1 schematically depicts a representation of a lap joint between two plastic-coated metallic foils.

FIG. 2 is a schematic sectional configuration of a sealed lap joint between two plastic double-coated metal foils.

In FIG. 1 there is schematically depicted a joint generally designated by the reference numeral 10. The joint 10 comprises a first plastic-coated foil 11 having a diagonally cut end 12, a second plastic-coated metal foil 13 having a diagonally cut end 14. The foil 11 has an upwardly facing plastic layer 15 and the foil 13 has an upwardly facing plastic layer 16. A region of overlap generally designated by the reference numeral 17 lies between the ends 12 and 14 of the strips 11 and 13, respectively. A window is formed in the plastic layer 15 by the hereinbefore described brushing technique. The window 17 provides a region of contact between the metallic layers of the foils 11 and 13. In the region of the window 17 are provided a plurality of welds 18 joining the foils 11 and 13 together. As depicted, the welds 18 are formed by cold welding apparatus such as is disclosed in U.S. Pat. No. 3,618,842 (the teachings of which are herewith incorporated by reference), or alternately are a plurality of spot welds formed in the manner hereinbefore described. Beneficially, a window such as the window 17 is readily formed in the plastic layer of a laminate such as the laminate 15 by clamping the foil to a suitable supporting surface utilizing a template having an opening generally conforming to the configuration of the window 17, allowing rapid brushing or cleaning of the surface to a desired degree.

In FIG. 2 there is schematically depicted a sectional view of an alternate joint prepared generally in accordance with the method of the present invention designated by the reference numeral 25. The joint 25 comprises a first plastic/metal laminate 26 having a malleable and weldable metallic core 27. The core 27 has a first surface layer 28 and a second surface layer 29, each of the layers being of synthetic resinous thermoplastic material. The layer 28 defines a window or opening 31 which beneficially is of similar configuration to the window 17 of FIG. 1. A second similar laminate 32 is generally oppositely disposed to the laminate 26 and overlaps the laminate 26 in a region generally designated by the reference numeral 34. The laminate 32 is of generally similar or like construction to the laminate 26 and has a metal core 35, a first surface layer 36 and a second oppositely disposed surface layer 37. The layers 36 and 37 are also of synthetic resinous thermoplastic material. The layer 37 defines a window or opening 31a which is of generally similar configuration to the window 31 of the laminate 26. In the region 34, cross portions 35 have been mechanically deformed to provide contacting mating relationship at the location 38 and are welded, soldered, brazed or otherwise fastened in intimate mechanical and electrical contact. A first sealing means 39 is disposed over and adhered to the layer 29 of the laminate 36 and the layer 37 of the laminate 32. Beneficially the sealing strip 39 is also of synthetic resinous thermoplastic material, preferably but not necessarily of identical composition to the layers 37 and 29 and provide a generally moisture impervious seal between the plastic surface layers 29 and 37, preventing contact of the region 38 or the edges of the laminate with moisture which, on long term exposure, may result in sufficient corrosion to cause failure of the joint either electrically and/or mechanically. A similar sealing means or strip 41 is oppositely disposed and joins the surface layers 28 and 32 to provide a totally enclosed joint.

In both of the embodiments of FIGS. 1 and 2, the formation of a window such as the window 17 leaves a region such as the regions 42 and 43 of FIG. 2 where there is a direct plastic-to-plastic contact between the surface layers of the laminates. Beneficially the regions such as the regions 42 and 43 are heat sealed, solvent sealed or adhesively sealed to provide essentially total encapsulation of the metal core. Encapsulation of the core minimizes the possibility of corrosion failure of the joint in service. Excellent and highly reliable joints have been obtained, employing the hereinbefore described process using both single- and double-coated laminates having a core of 7 mil thick aluminum and surface layers of 3 mil thick ethylene/acrylic acid copolymer containing about 12 weight percent acrylic acid. In configurations such as are depicted in FIGS. 1 and 2, the windows are prepared employing 1-½ inch diameter stainless steel wire brush having 5 mil thick bristles about three-eighths inch to one-half inch in length rotating at about 20,000 revolutions per minute, as well as with a similar brush using bristles having diameters of 0.003. The laminates are cold welded together employing the apparatus of U.S. Pat. No. 3,618,843. In the event where such laminates are sealed as depicted in FIG. 2, a 3 mil thick film of ethylene/acrylic acid copolymer is heat sealed over the lapped joints to provide protection for the edges of the laminate. In preparing such laminates, the freshly brushed surfaces are dusted to remove any finely divided polymer remaining prior to cold pressure welding. The resulting splices are prepared quickly, have excellent electrical and mechanical properties and are found to be eminently satisfactory for use in electrical cables.

In a manner similar to the foregoing, a wide variety of other laminates are readily joined including plastic-coated copper, steel laminates and the like using other hereinbefore described thermoplastic materials.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. A method for the joining of first and second plastic/metal laminates wherein a portion of a plastic layer is removed from at least one of the laminates and the laminates joined in metal-to-metal contact wherein at least one of the metal surfaces to be joined has had a plastic coating thereon, the steps of the method comprising contacting at least one plastic layer surface of the plastic first laminate with a rapidly rotating impacting and shearing means for a time sufficient to remove plastic material and cause the surface of the metal underlying the removed plastic material to achieve a grainy appearance, the shearing and impact means having a plurality of impacting bristles generally radially disposed about a rotating shaft and having an unsupported length to diameter ratio of at least about 20:1, the terminal portion of the bristles remote from the rotating shaft having a surface speed of at least 3000 feet per minute, thereby removing a desired portion of the plastic layer, and subsequently joining the exposed metal surface of the first laminate to the metal layer of the second laminate and heat sealing at least two plastic layers together.

2. The method of claim 1 wherein two generally identical plastic/metal laminates are joined.

3. The method of claim 1 wherein the laminates are joined by cold welding.

4. The method of claim 1 including the step of removing a window in the plastic layer of the laminates to be joined.

5. The method of claim 4 including the step of heat sealing a plastic film over any adjacent exposed portions of the metal layers.

* * * * *